Sept. 17, 1940.   W. R. SWEET ET AL   2,214,842
MESH MATERIAL
Filed June 15, 1938
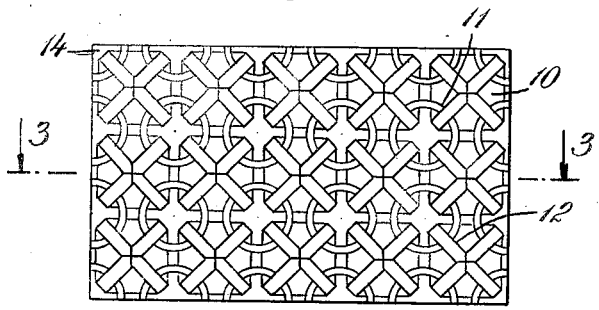
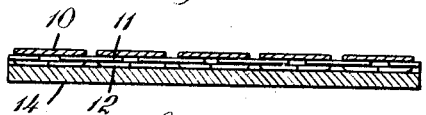
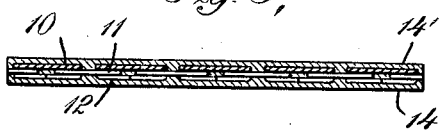
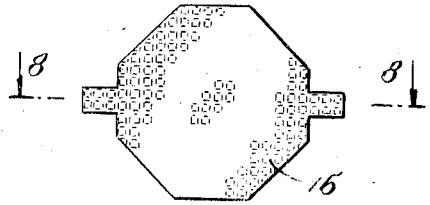
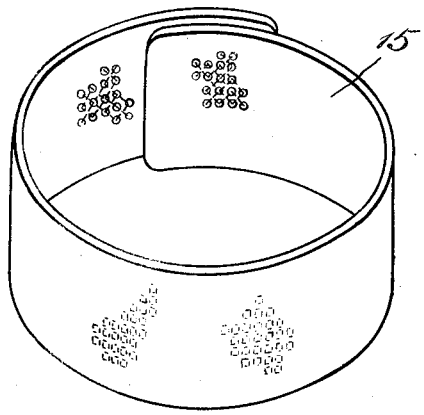
INVENTORS
William R. Sweet
Lee R. Higgins
BY
Pennie Davis Marvin Edmonds
ATTORNEYS Patented Sept. 17, 1940

2,214,842

UNITED STATES PATENT OFFICE 2,214,842

MESH MATERIAL

William R. Sweet, Mansfield, and Lee R. Higgins, Plainville, Mass., assignors to Whiting & Davis Company, a corporation of Massachusetts Application June 15, 1938, Serial No. 213,848

4 Claims. (Cl. 154—46)

This invention relates to metal mesh materials and has particular reference to a novel material of this type which is more attractive and durable than prior mesh materials and is relatively stiff, whereby it may be formed into ornaments and other articles which have the quality of retaining their shape. The new material may be made from so-called "fish-scale" mesh, from "ring" mesh, or from metal mesh of any other type, and it can be made expeditiously at low cost by a novel method which also forms part of the invention.

Fish-scale mesh, as distinguished from ring mesh, consists of longitudinal and transverse, alternate rows of metal rings and cruciform links, each of the links having its arms bent inwardly around the four rings adjacent to it. Mesh of this form is characterized by its extreme flexibility which renders it suitable for numerous purposes where this quality is desired, but which makes it unsuited for forming articles of more or less permanent shape. Also, the arms of the cruciform links are occasionally caught in clothing, etc., and are thus bent outwardly from their normal positions so that they form sharp projections which make the mesh objectionable. Ring mesh, which consists of longitudinal and transverse rows of interlinked, metal rings, is likewise extremely flexible and incapable of retaining its form, and, while it is not as apt to be caught in clothing and the like, its surfaces are more or less rough, depending on the size of the rings.

The present invention, therefore, is directed to the provision of a novel material of the metal mesh type which is relatively stiff and presents a smooth, finished surface. The new material, in addition, is more resistant to corrosion and wear than prior materials of this type and may be made of any desired degree of stiffness by the new method.

The material of the invention comprises a metal mesh of any desired type, which is coated with or embedded in a plastic material to render the mesh capable of retaining a desired shape or form. Preferably, the plastic material is an organic plastic which is substantially transparent and is applied to at least one surface of the mesh so that it penetrates between the parts thereof and forms a binder which stiffens the mesh. In the case of fish-scale mesh, we prefer to apply a layer of the plastic material to the rear face of the mesh, that is to the relatively rough face on which the arms of the links are disposed, whereby the layer serves not only to stiffen the mesh, but also to give it a smooth rear surface and prevent the link arms from bending outwardly. If desired, the mesh may be provided with a layer of the plastic material on both faces thereof, thereby adding to its stiffness and affording an additional measure of protection to the parts of the mesh.

According to the method of the invention, a layer of plastic material is applied to one face of a sheet of metal mesh and is then subjected to pressure so that some of the plastic is forced inwardly between the rings or other parts of the mesh to form a binder for these parts, which would otherwise be loose. The binder is preferably a thermo-plastic, whereby the application of heat to the material, before pressing it, softens the material and facilitates the operation of forcing it between the parts of the mesh. The extent to which the plastic material is made to penetrate the mesh may vary, but where the material is applied to only one face of the mesh, we prefer to control the penetration so that the opposite face of the mesh is fully exposed. In the practice of the new method, the stiffness of the resulting product may be controlled within a wide range by the thickness and composition of the layer of plastic material on one or both sides of the mesh.

It will be apparent that the new material may be made from ordinary metal mesh in a few simple operations and with any desired degree of stiffness. The coating of plastic material not only provides a stiffening medium or binder for the parts of the mesh, but also protects the metal from corrosion and wear and forms a smooth surface which, when a transparent plastic is used, exposes the mesh to view and preserves the natural lustre of the metal. The mesh material may be readily formed into articles of ornamentation or utility, or both, and the articles thus formed will retain their shape indefinitely.

For a better understanding of the invention reference may be had to the accompanying drawing, in which Fig. 1 is a plan view of one form of the new mesh material;

Fig. 2 is a detail view in section showing a layer of plastic material applied to a sheet of metal mesh before the material is pressed into the mesh;

Fig. 3 is a detail view on the line 3—3 in Fig. 1, showing the plastic material after it has been pressed into the mesh;

Fig. 4 is a detail view in section showing layers of plastic material applied to both faces of a sheet of mesh before the material is pressed into the mesh;

Fig. 5 is a similar view showing the layers illustrated in Fig. 4 after they have been pressed into the mesh;

Fig. 6 is a perspective view of an article made from the new material;

Fig. 7 is a plan view of another article made from the new material, and

Fig. 8 is a section on the line 8—8 in Fig. 7.

Referring to Fig. 1 in the drawing, the material there shown comprises a sheet of metal mesh which may be of any desired type but which, as illustrated, is of the fish-scale type including a plurality of rows of cruciform links 10, each row being disposed between rows of rings 11. The arms 12 of each link are bent around the four rings adjacent to it so that the ends of the arms overlie the rear face of the link, whereby the back of the mesh presents a rough surface. The front of the mesh, however, has a relatively smooth surface for the reason that only the faces of the links are exposed.

On the back of the sheet of mesh is a layer of plastic material 14 of substantially uniform thickness throughout and covering the entire rear face of the mesh. The material 14 may be any kind of plastic, but we prefer to employ a transparent, thermoplastic material, such as cellulose acetate, nitrate cellulose, Celluloid, a phenol aldehyde, an alkyd resin, a methacrylate or acrylate, a urea or thiourea aldehyde, styrene, or the like. As shown particularly in Fig. 3, the layer 14 is applied to the mesh so that part of the material penetrates between the links 10 and rings 11, whereby the arms 12 of the links and the rear faces of the rings are firmly embedded in the material. However, the front face of the mesh, composed of the smooth faces of the links 10, is not covered by the plastic material but is fully exposed.

With this construction, the layer of plastic material 14 acts as a binding medium for the links 10 and rings 11, which would otherwise be loose, and renders the resulting sheet relatively stiff so that it may be easily formed into articles of various shapes and will retain its form. Also, the layer completely covers the arms 12 of the cruciform links, whereby the latter cannot be caught in clothing, etc., and are always maintained in their normal positions adjacent the rear faces of the links. The layer 14, being transparent, exposes the rear face of the mesh to view, and in addition it protects the arms 12 and the rear faces of the links and rings against corrosion and wear and provides a smooth surface of pleasing appearance.

In the manufacture of the new material according to the invention, the layer of thermoplastic material 14 is placed against the rear face of the mesh, as shown in Fig. 2, and is then subjected to heat and pressure until the desired embedment of the parts of the mesh in the plastic material is obtained. When the material 14 is heated, it becomes relatively soft and plastic, so that when pressure is applied to the material, it is easily forced or extruded between the links 10 and rings 11 of the mesh, as shown in Fig. 3. By proper control of the temperature and pressure to which the plastic material is subjected, the extent to which it penetrates the mesh may be controlled so that the front face of the mesh is left uncovered. As the plastic material cools, it gradually hardens in the desired form and provides a smooth, durable and attractive surface.

In some instances, it may be desirable to form the mesh material with thermo-plastic coatings on both faces, particularly when it is desired to increase the stiffness of the material and provide additional protection against corrosion and wear. In the production of this form of mesh material, layers 14 and 14' of a transparent thermo-plastic are applied to the rear and front faces, respectively, of the mesh, as shown in Fig. 4, and subjected to the action of heat and pressure until the material is caused to penetrate the mesh, as shown in Fig. 5. As there shown, the arms 12 and the rear faces of the links and rings are firmly embedded in the plastic material, and the front faces of the links are provided with a transparent covering of substantial thickness. Accordingly, the resulting composite sheet offers a substantial resistance to bending, the amount of resistance depending upon the thickness of the layers 14 and 14' and their composition. The layers 14 and 14' provide smooth, finished surfaces on the front and rear faces of the mesh and fully protect the mesh against corrosive actions and wear. The smooth front faces of the links 10 are visible through the layer 14' and are maintained indefinitely with their natural lustre by reason of the protective covering afforded by the plastic material.

It will be apparent that the new mesh material may be easily formed into various useful and decorative articles, such as the bracelet 15 shown in Fig. 6, or the buckle 16 shown in Figs. 7 and 8. In the formation of these articles, the mesh material may be bent or otherwise formed into the desired shape immediately after the layer or layers of thermo-plastic material have been pressed into the mesh and while they are still soft and plastic, so that the thermo-plastic material on cooling will harden and retain the desired set, or the layers may be bent in the desired shape before they are applied and pressed into the mesh. If desired, a plastic may be selected which is somewhat soft and flexible at normal temperatures, so that it may be applied to the mesh without subjecting it to heat, and when such a plastic is used, the resulting composite sheet may be manipulated into the desired form at room temperature.

While we have illustrated in the drawing a mesh material made from fish-scale mesh, it will be understood that other kinds of mesh may be used as well. Also, the parts of the mesh may be of any desired configuration or design and may be colored or of natural metallic hue. The plastic layer or layers may also be colored, if desired, and may be provided with suitable designs embossed or otherwise formed thereon.

We claim:

1. A product of the character described comprising a sheet of metal mesh including alternate rows of cruciform links and rings, each of the links having the arms thereof extending through the four rings adjacent to it and bent inwardly adjacent the rear face of the link, and a layer of plastic material covering the back of the mesh and in which said arms are embedded and held in place, the material penetrating between and binding the rings and links to stiffen the mesh, the front faces of the links being free of said material.

2. A product of the character described comprising a sheet of metal mesh including alternate rows of cruciform links and rings, each of the links having the arms thereof extending through the four rings adjacent to it and bent inwardly adjacent the rear face of the link, and a transparent plastic material covering the front and rear faces of the mesh and in which said arms are embedded, the material penetrating between and binding the rings and links to stiffen the mesh.

3. A product of the character described comprising a sheet of metal mesh including rings and links, the links having arms extending through the rings and overlying the rear faces of the links, whereby the mesh has a relatively smooth front surface and a relatively rough rear surface, and a layer of material covering said rear surface and penetrating between and binding the links of the mesh to stiffen the sheet, the arms of the links being embedded in and held in place by said material, the relatively smooth surface of the mesh being free of said material.

4. A product of the character described comprising a sheet of metal mesh including alternate rows of links and rings, each link having arms extending through rings adjacent thereto and bent inwardly adjacent the rear face of the link, whereby the mesh has a relatively smooth front surface and a relatively rough rear surface, and a substantially transparent material covering both sides of the sheet and penetrating between and binding the links of the mesh to stiffen the sheet, the arms of the links being embedded in and held in place by said material.

LEE R. HIGGINS.
WILLIAM R. SWEET.